United States Patent
Chen

(10) Patent No.: US 10,562,259 B2
(45) Date of Patent: Feb. 18, 2020

(54) STRUCTURAL OBJECT HAVING SUBSTRATE SURFACIALLY PROTECTED AND INTEGRALLY CLAD WITH METALLIC GLASS SHEET

(71) Applicant: Kuan-Wei Chen, Tainan (RU)

(72) Inventor: Kuan-Wei Chen, Tainan (RU)

(73) Assignee: Taichi Metal Material Technology Co., Ltd., Tainan (TW)

( * ) Notice: Subject to any disclaimer, the term of this patent is extended or adjusted under 35 U.S.C. 154(b) by 374 days.

(21) Appl. No.: 15/489,691

(22) Filed: Apr. 17, 2017

(65) Prior Publication Data

US 2018/0297675 A1  Oct. 18, 2018

(51) Int. Cl.
| | |
|---|---|
| *B32B 1/08* | (2006.01) |
| *B32B 5/14* | (2006.01) |
| *B32B 15/08* | (2006.01) |
| *B63B 59/04* | (2006.01) |
| *F16L 9/14* | (2006.01) |
| *F15D 1/00* | (2006.01) |
| *F15D 1/06* | (2006.01) |
| *B32B 1/00* | (2006.01) |
| *B32B 15/01* | (2006.01) |
| *B32B 15/082* | (2006.01) |
| *B32B 15/092* | (2006.01) |
| *B32B 15/085* | (2006.01) |
| *B32B 1/02* | (2006.01) |
| *C22C 1/00* | (2006.01) |

(52) U.S. Cl.
CPC .............. *B32B 1/08* (2013.01); *B32B 1/00* (2013.01); *B32B 1/02* (2013.01); *B32B 5/14* (2013.01); *B32B 5/145* (2013.01); *B32B 15/01* (2013.01); *B32B 15/08* (2013.01); *B32B 15/082* (2013.01); *B32B 15/085* (2013.01); *B32B 15/092* (2013.01); *B63B 59/045* (2013.01); *F15D 1/005* (2013.01); *F15D 1/06* (2013.01); *F16L 9/14* (2013.01); *B63B 2231/02* (2013.01); *B63B 2231/70* (2013.01); *C22C 1/002* (2013.01)

(58) Field of Classification Search
CPC .. B32B 1/02; B32B 1/08; B32B 15/08; B32B 15/082; B32B 15/085; B32B 15/092; B32B 5/14; B32B 5/145
See application file for complete search history.

(56) References Cited

U.S. PATENT DOCUMENTS

| | | | | |
|---|---|---|---|---|
| 7,807,251 B1 * | 10/2010 | Wallach | ................... | B32B 17/06 428/157 |
| 9,339,990 B2 * | 5/2016 | Jang | ..................... | C22C 45/10 |
| 2014/0064043 A1 * | 3/2014 | Tsuchiya | ............... | G04D 3/0076 368/140 |

* cited by examiner

*Primary Examiner* — Walter Aughenbaugh

(57) ABSTRACT

A structural object includes a substrate integrally clad with a metallic glass sheet by adhering, welding or joining the metallic glass sheet on the substrate for a low-cost, flexible and convenient fabrication, assembly, processing or construction of the object.

2 Claims, 4 Drawing Sheets

STRUCTURAL OBJECT HAVING SUBSTRATE SURFACIALLY PROTECTED AND INTEGRALLY CLAD WITH METALLIC GLASS SHEET

BACKGROUND OF THE INVENTION

It is known that metallic glass has the advantageous properties, including: high hardness, high fracture strength, high yield strength and, high corrosion resistance.

So, a substrate may be coated with a metallic glass thin film to increase its mechanical properties for engineering uses.

U.S. Pat. No. 9,339,990 disclosed a Zr-based or Zr—Cu based metallic glass thin film (MGTF) coated on an aluminum alloy substrate to improve many mechanical properties of the MGTF coated aluminum alloy substrate by using a sputtering process, which however has the following drawbacks:
1. When performing the sputtering, the metal glass target serves as a cathode and the substrate, having a buffering layer thereon for sputtering, serves as an anode, and a DC magnetron sputter machine is provided to form the metallic glass thin film on the substrate. A chamber for the sputtering should be vacuumed, and then directed with argon gas into the chamber. So, such a sputtering process can only be performed within a fixed chamber for coating MGTF on a substrate, not suitable for coating metallic glass on a substrate of an object or structure already built in a construction site or place, thereby limiting its industrial and commercial uses.
2. For coating a gigantic structure or long-distance object with MGTF, such a sputtering process and apparatus will be improper and will be greatly limited for its on-site service. For example, if it is intended to coat a long pipe with MGTF, a great difficulty to build and operate such a big sputtering apparatus will be encountered.

The present inventor has found the drawbacks of the conventional art and invented the present structural object which can be easily clad with a metallic glass sheet for the surface protection of the object.

SUMMARY OF THE INVENTION

The object of the present invention is to provide a structural object including a substrate integrally clad with a metallic glass sheet by adhering, welding or joining the metallic glass sheet on the substrate for a low-cost, flexible and convenient fabrication, assembly, processing or construction of the object.

Another object of the present invention is to provide a metallic-glass clad conduit having a micro-turbulent boundary layer formed as a micro-structure surface in an inner surface of the metallic-glass sheet as cylindrically formed in the fluid conduit in order to reduce a skin drag of the conduit, thereby increasing the fluid velocity of a fluid flowing in the conduit.

Still another object of the present invention is to provide a hull or housing (such as of a ship or under-water equipment) including a metallic glass sheet having a micro-structured surface and clad on a substrate of the hull or housing and having an electrical pulse generating circuit formed on the metallic glass sheet for producing electrical pulses or acoustical shock waves for preventing biofouling on the hull or housing surface by organisms or barnacles, thereby well protecting the hull or housing, increasing the ship coursing speed, reducing the fuel consumption, and improving corrosion resistance.

DETAILED DESCRIPTION

The present invention comprises a structural object or object having a substrate 1 clad with a metallic glass sheet 2 on a surface of the substrate 1. The present invention also comprises a process for making such an object having metallic glass sheet clad on a substrate of the object.

A metallic glass sheet is made by feeding molten alloy of metallic glass through a pair of cooling wheels for rapidly cooling the molten alloy into metallic glass sheet. The thickness of the metallic glass sheet can be adjusted by adjusting the gap between the two cooling wheels. Each metallic glass sheet may have a thickness of several microns to hundreds of microns, not limited in the present invention.

The "sheet" of metallic glass as defined in the present invention may also be referred to a metallic glass piece, strip, strap, band, fabric or layer, not limited in this invention.

The "object" of the present invention may refer to a pipe, a beam (such as 1 beam) of building materials, a bridge, a building structure, a ship or boat, a vehicle, a container, a tank, a reactor, a vessel, or any structural object.

The substrate 1 may include: metal, alloy, ceramic, plastic, glass, fibers and any other substrate materials.

The metallic glass of this invention may include: Fe-based metallic glass, Ni-based metallic glass, Al-based metallic glass, Mg-based metallic glass, Co-based metallic glass, and the other metallic glasses, including multiple-element based metallic glass, not limited in this invention.

Figure 1:
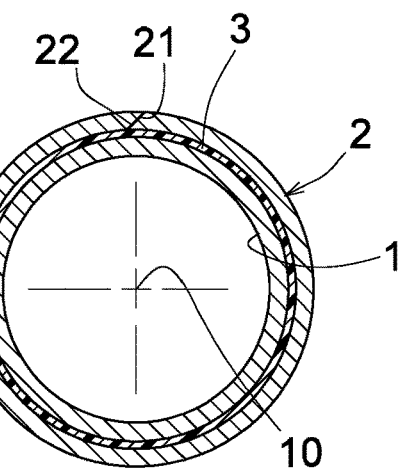
FIG. 1 is a cross sectional drawing of a pipe as made in accordance with the present invention.
Figure 2:
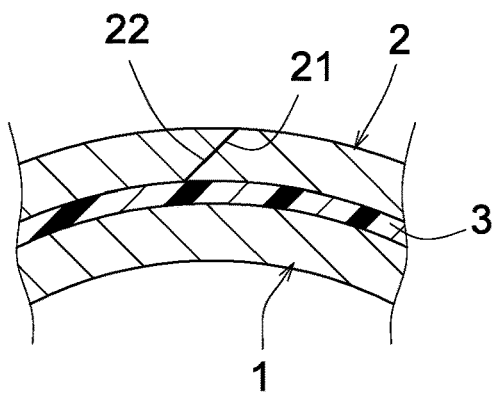
FIG. 2 is a partial sectional drawing as enlarged from a portion of FIG. 1.

As shown in FIGS. 1 and 2, the metallic glass sheet 2 is clad or joined on the substrate 1, a steel pipe, as bonded by an adhesive 3 between the inner substrate 1 and the outer metallic glass sheet (or layer) 2. Adhesives available in the market may be selected from: acrylics, epoxies, phenolics, polyamides, etc., but not limited in this invention.

A Fe-based metallic glass, having high hardness and strength, may be used for an object which is required for better abrasion resistance. A Ni-based metallic glass may, however, be used for high corrosion resistant products with bright and anti-corrosion surfaces. So, the selection of metallic glass depends upon the requirements by end-users, mechanical and chemical properties as desired, cost reasons, and the other related factors.

Figure 3:
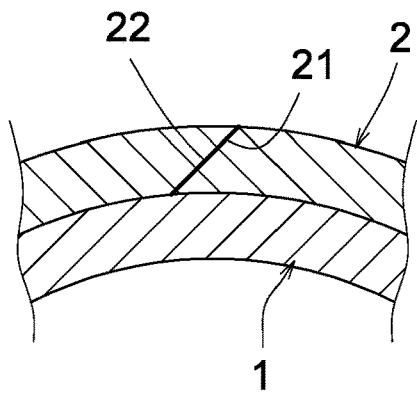
FIG. 3 is a partial sectional drawing of the present invention.

As shown in FIGS. 1~3, the outer metallic glass sheet 2 as clad or wrapped on the inner substrate 1 to form a steel pipe clad with metallic glass sheet (or cylindrical layer) 2, having a first spliced end portion 21 overlapped and joined with a second spliced end portion 22 to form a joining seam as small as possible.

The first spliced end portion 21 is tapered outwardly or upwardly from an axis 10 of the substrate 1 (pipe); while the second spliced end portion 22 is tapered inwardly or downwardly towards the axis 10 in order to be inclinedly or tangentially engaged, or joined with each other.

Such two spliced end portions 21, 22 may be joined together by welding or adhesive bonding therebetween, not limited in this invention.

However, the shapes or forms of the two spliced end portions of the outer metallic glass sheet 2 are not limited, which can also be joined in the form of butt-spliced adhesion or bonding.

As shown in FIG. 3, the adhesive 3 is omitted. The outer metallic glass sheet 2 is then joined to the inner substrate 1 by welding or by other joining methods. The welding may be selected from: soldering, high-temperature fusion welding, friction welding, vacuum cold welding, etc.

If the metallic glass sheet 2 is made of fibers, which are spinned to be filaments, woven as fabric, laminated to be a bulk metallic glass sheet, a "4-in-1" process (pressure, temperature, vibration and friction) may be applied for joining the metallic glass fabric sheet 2 onto the substrate 1, namely, by applying proper temperature and pressure to the laminates composed of the metallic glass fabric sheet on the substrate and then applying ultrasonic vibrations and friction among the metallic glass sheet and the substrate to thermally weld the metallic glass sheet on the substrate firmly.

The metallic glass sheet 2 may be clad on an inner surface, or on an outer surface, or on both inner and outer surfaces of the substrate 1.

A process for making the structural object of the present invention comprises:
A. Preparing a substrate;
B. Preparing a metallic glass sheet; and
C. Joining the metallic glass sheet on at least one surface of the substrate of the object, including: bonding the metallic glass sheet on the substrate by adhesive; and welding the metallic glass sheet with the substrate.

Other joining methods may be used in this invention.

The object thus obtained may enhance the mechanical properties in addition to the original properties as owned by the substrate itself. Form example, a steel pipe may increase its corrosion resistance after being clad with the metallic glass layer in accordance with the present invention.

Accordingly, the present invention has the following advantages superior to the prior art as coated with metallic glass thin film:
1. The metallic glass sheet can be clad on the substrate at a construction site or in a factory for a fabrication or assembly convenience.
2. The production or assembly cost is lowered since a high-cost sputtering chamber is no longer needed.
3. For forming the metallic glass sheet on a gigantic structure such as a ship hull, the present invention may be provided for coating or welding the metallic glass sheet on the surface of the gigantic structure easily.
4. The present invention may incorporate adhesive bonding process to adhere the metallic glass sheet on the substrate, without building a sputtering chamber which will consume much electrical energy for a conventional MGTF deposition process, so as to produce an object clad with metallic glass sheet for saving energy.

Figure 4:
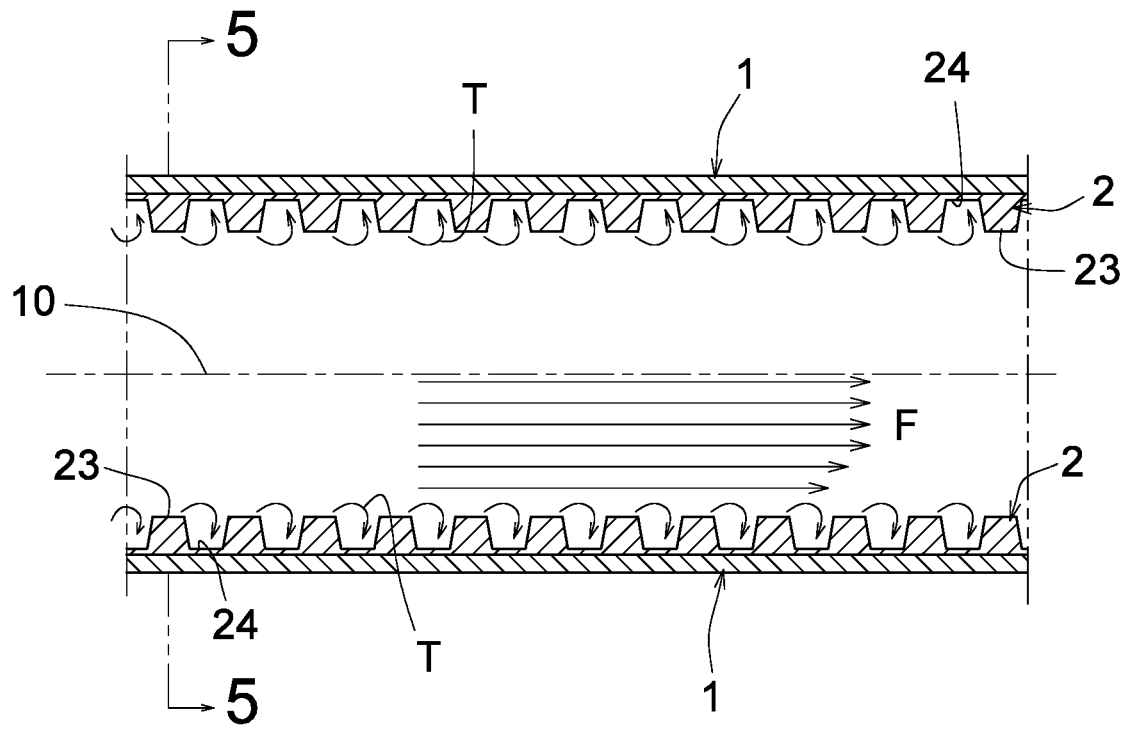
FIG. 4 is a longitudinal sectional drawing of a pipe of a second preferred embodiment of the present invention.
Figure 5:
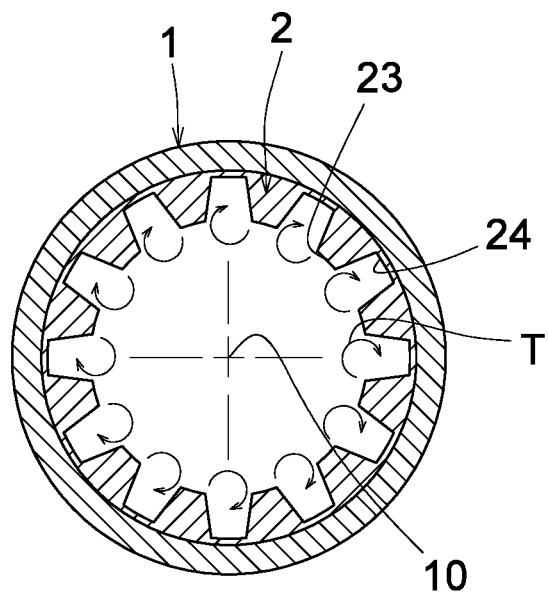
FIG. 5 shows a cross sectional drawing as viewed from Line 5-5 section of FIG. 4.
Figure 6:
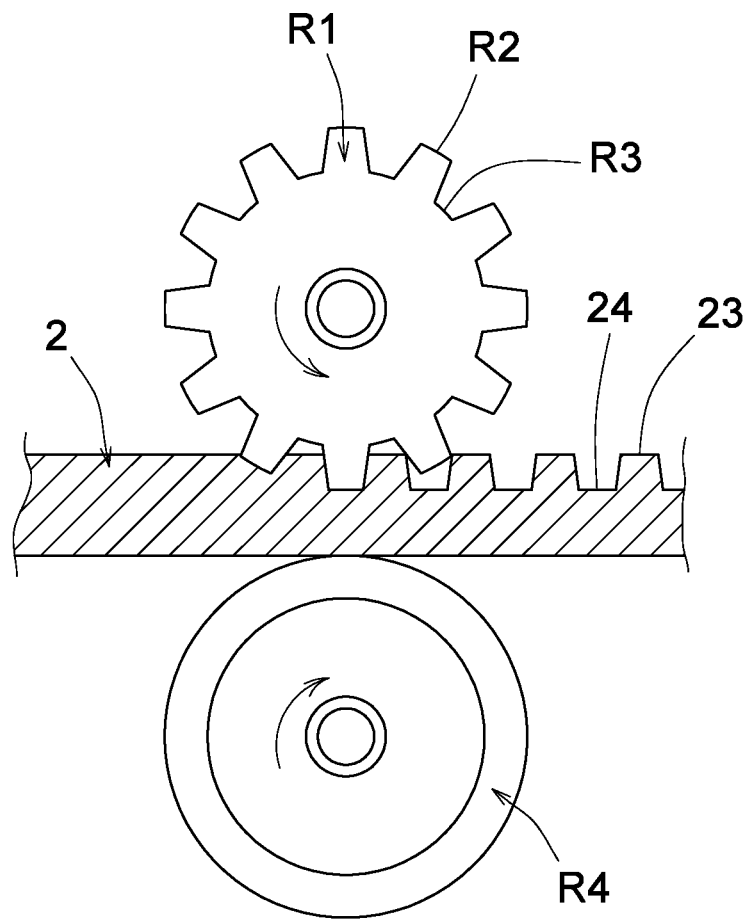
FIG. 6 is an illustration showing the implementation of a roller mold with micro-structure for forming a corrugated metallic glass sheet of the present invention.

As shown in FIGS. 4~6, the present invention further comprises an object clad with a metallic glass sheet, which is formed with a micro-structure surface on the surface of the metallic glass sheet. For better illustration purpose, a substrate 1 of pipe as clad with the metallic glass sheet 2 as cylindrically formed on an inner surface of the substrate (pipe) is given herewith.

The metallic glass sheet 2, substantially a cylindrical sheet, is formed with a micro-structure surface including protrusions 23 and grooves 24 alternatively corrugatedly formed on the surface of the metallic glass sheet 2.

Each groove 24 among two protrusions 23 forms a localized micro turbulent flow T for producing a micro turbulent boundary layer, when a fluid (including water, air, oil, etc.) flows through a pipe (a micro-structured metallic glass sheet 2 cylindrically formed in a cylindrical-shaped substrate 1 of a pipe) shown in FIGS. 4 and 5, may reduce the skin drag of the pipe so as to increase the fluid velocity F (FIG. 4).

By the way, the increased fluid speed of a fluid flowing through a micro-structured surface as aforementioned may have the advantages of: increasing the navigation or flying speed of a ship or airplane; saving fuel energy and cost; reducing fouling or biofouling, such as caused by underwater organisms, barnacles, or scales.

The micro structure surface on the metallic glass sheet 2 may be formed by direct imprinting, nano imprinting or roll-to-roll stamping.

As shown in FIG. 6, a roller with micro-structured surface R1, having corrugated perimeter alternatively formed with protruded teeth R2 and recessed grooves R3 around the periphery of the teeth roller R1, is provided for continuously shaping or forming the micro-structured metallic glass sheet 2 as backed by a backing roller R4, whereby upon heating and pressurizing by the roller R1, the sheet 2 will be alternatively formed with protrusions 23 and grooves 24 lengthwise along the sheet. The metallic glass sheet, with micro-structured surface, should then be cooled for further processing.

Each protrusion 23 or groove 24 may be formed as trapezoid shape, or other shapes, not limited in this invention.

Figure 7:
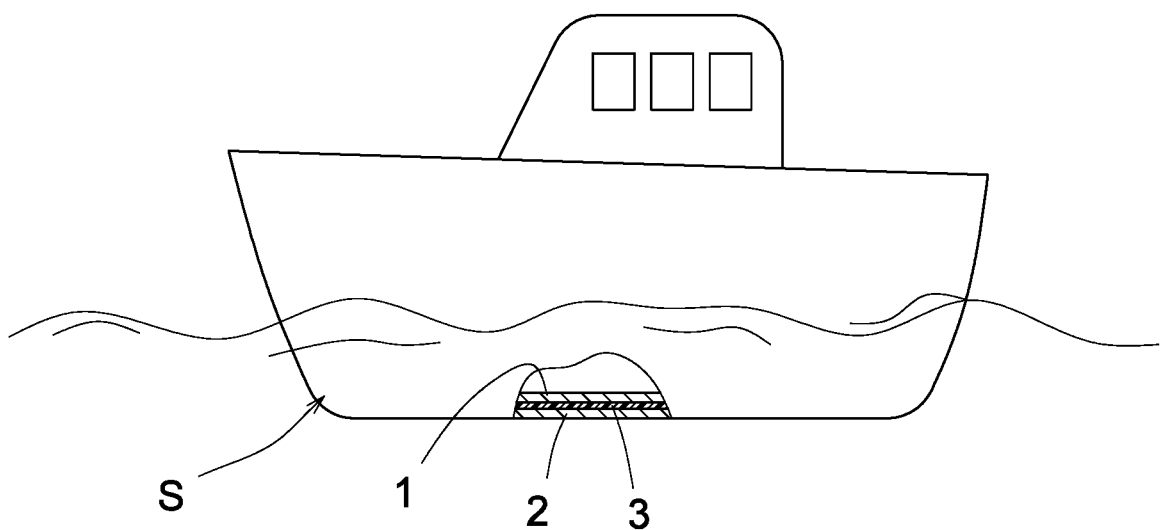
FIG. 7 is an illustration showing a ship as protected by an electrical pulse generating circuit in accordance with the present invention.
Figure 8:
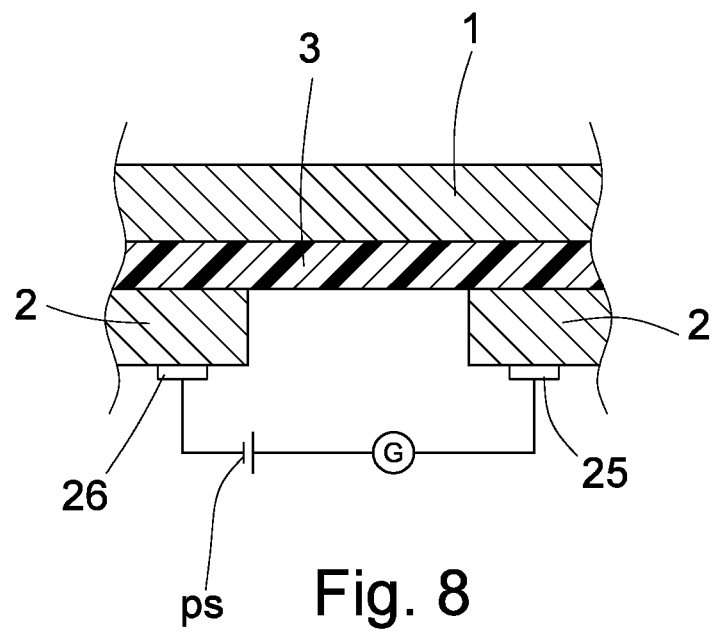
FIG. 8 shows the electrical pulse generating circuit as provided for the ship as shown in FIG. 7.

As shown in FIGS. 7 and 8, the metallic glass sheet 2 may be clad onto the substrate 1 of a ship hull S as shown in FIG. 7 as bonded by adhesive 3 therebetween, so as to enforce the ship to be corrosion resistant.

Furthermore, an electric pulse may be applied to the hull S to prevent biofouling, including anti-fouling of barnacles as deposited and growing on the hull.

In FIG. 8, an electric defouling circuit (or an electrical pulse generating circuit) is provided to produce electrical pulses in order to expel or defoil the organisms or barnacles deposited on the hull. The electric defouling circuit includes: a first electrode (such as a positive electrode) 25 electrically connected to a first portion of the metallic glass sheet 2 as adhered to the substrate 1 with an electrically insulating adhesive 3 coated between the substrate 1 (of hull S) and the metallic glass sheet 2, a second electrode (such as a negative electrode) 26 electrically connected to a second portion of the metallic glass sheet 2 adhered to the substrate 1, a power source PS and a pulse generator G formed in the circuit between the first electrode 25 and the second electrode 26, whereby upon actuation of the electric defouling circuit, a lower-current high-voltage electrical pulse will be produced in between the first and second electrodes 25, 26 to thereby expel or defoul the organisms or barnacles as deposited on the hull surface. An on-off switch, a voltage controller or a pulse adjuster (not shown) may also be provided in the circuit.

Due to the pulses as produced by such an electric defouling circuit, the organism or barnacles will be expelled, removed or defouled from the hull surface, thereby protecting the surface of a ship, reducing maintenance cost and prolonging the service life of a ship. Other underwater or marine equipments or containers may also be protected with such a defouling circuit.

The present invention may be further modified without departing from the spirit and scope of the present invention.

I claim:

1. An object comprising:
    a substrate; and
    a metallic glass sheet integrally clad on at least one surface of said substrate by adhesive bonding, welding or joining between said metallic glass sheet and said substrate;
    said metallic glass sheet having a micro-structured surface formed on a surface of said metallic glass sheet, said micro-structured surface comprising a plurality of protrusions and grooves alternatively corrugatedly formed on said metallic glass sheet, having each said groove, defined between two said protrusions, whereby upon a fluid flowing through said micro-structured surface of said metallic glass sheet, a micro turbulent boundary layer will be formed along the micro-structured surface to reduce the skin drag of the object and to increase the fluid velocity.

2. An object according to claim 1, wherein said metallic glass sheet with micro-structured surface is cylindrically formed on said substrate as cylindrically shaped to form a pipe or conduit.

* * * * *